United States Patent
Feldman et al.

(10) Patent No.: US 8,078,956 B1
(45) Date of Patent: Dec. 13, 2011

(54) SYSTEM, METHOD, AND COMPUTER PROGRAM PRODUCT FOR CREATING A SECOND XML FORM BASED ON A FIRST XML FORM

(75) Inventors: Samuel Feldman, Cupertino, CA (US); Michelle Brodale, Sunnyvale, CA (US); Steve Farrell, Raleigh, NC (US)

(73) Assignee: Amdocs Software Systems Limited, Dublin (IE)

( * ) Notice: Subject to any disclaimer, the term of this patent is extended or adjusted under 35 U.S.C. 154(b) by 841 days.

(21) Appl. No.: 11/870,989

(22) Filed: Oct. 11, 2007

(51) Int. Cl.
*G06F 17/00* (2006.01)

(52) U.S. Cl. ........................................................ 715/223

(58) Field of Classification Search .................. 715/221, 715/223, 222
See application file for complete search history.

(56) References Cited

U.S. PATENT DOCUMENTS

| | | | | |
|---|---|---|---|---|
| 5,267,303 A * | 11/1993 | Johnson et al. | .......... | 379/100.07 |
| 5,563,999 A * | 10/1996 | Yaksich et al. | ............... | 715/209 |
| 7,281,018 B1 * | 10/2007 | Begun et al. | .......................... | 1/1 |
| 7,346,840 B1 * | 3/2008 | Ravishankar et al. | ........ | 715/234 |
| 7,721,190 B2 * | 5/2010 | Sikchi et al. | ................... | 715/223 |
| 7,734,995 B1 * | 6/2010 | Saikaly | .......... | 715/200 |
| 7,747,938 B2 * | 6/2010 | Elkady | .......... | 715/209 |
| 7,831,919 B1 * | 11/2010 | Viljoen et al. | ................. | 715/762 |
| 7,870,478 B1 * | 1/2011 | Chiaro et al. | ................. | 715/223 |
| 7,941,744 B2 * | 5/2011 | Oppenlander et al. | ........ | 715/222 |
| 2003/0007014 A1 * | 1/2003 | Suppan et al. | ................. | 345/853 |
| 2004/0034684 A1 * | 2/2004 | Payne | .......... | 709/201 |
| 2005/0251733 A1 * | 11/2005 | Elkady | .......... | 715/503 |
| 2006/0059418 A1 * | 3/2006 | Elkady | .......... | 715/508 |
| 2006/0130047 A1 * | 6/2006 | Burugapalli | .......... | 717/170 |
| 2006/0136810 A1 * | 6/2006 | Truong et al. | ................. | 715/507 |
| 2006/0165123 A1 * | 7/2006 | Jerrard-Dunne et al. | ..... | 370/468 |
| 2007/0038684 A1 * | 2/2007 | Degtyar | .......... | 707/203 |
| 2007/0288837 A1 * | 12/2007 | Eaves et al. | .......... | 715/505 |
| 2007/0300145 A1 * | 12/2007 | Perelman et al. | .......... | 715/505 |
| 2008/0065978 A1 * | 3/2008 | Francker et al. | ............. | 715/223 |
| 2008/0072133 A1 * | 3/2008 | Eckelman et al. | ............ | 715/224 |
| 2008/0250308 A1 * | 10/2008 | Walsh et al. | .......... | 715/223 |
| 2009/0007095 A1 * | 1/2009 | Alverson et al. | ............. | 717/176 |
| 2011/0131480 A1 * | 6/2011 | Matveief et al. | ............. | 715/224 |

OTHER PUBLICATIONS

Kuo et al. Generating Form-Based User Interfaces for XML Vocabularies, ACM 2005, pp. 58-60.*

Hur et al., Web-based Diagnostic Imaging Service Using XML Forms, Google 2006, pp. 328-335.*

DevX Discussions, Is Inheritance Useless?, DevX.com Forums, Feb. 20-21, 2002, Retrieved from http://forums.devx.com/showthread.php?s=5abf3adc7bfc8e63f017ef2ca7ee48db&t=53795 on Feb. 1, 2011 (9 pages).

* cited by examiner

*Primary Examiner* — Cong-Lac Huynh
(74) *Attorney, Agent, or Firm* — Zilka-Kotab, PC

(57) ABSTRACT

A system, method, and computer program product are provided for creating a second form based on a first form where the first and second forms are defined in extended markup language (XML). In use, a first form is identified. Additionally, a second form is created based on the first form. Farther, the first form and the second form are defined in XML.

20 Claims, 6 Drawing Sheets

SYSTEM, METHOD, AND COMPUTER PROGRAM PRODUCT FOR CREATING A SECOND XML FORM BASED ON A FIRST XML FORM

FIELD OF THE INVENTION

The present invention relates to forms, and more particularly to creating and maintaining a second form from a first form.

BACKGROUND

Forms have traditionally been utilized for creating data, such as documents, reports, etc. For example, customized data is oftentimes based on a generic form that has been customized utilizing various configuration information. However, such traditional forms have generally been associated with various limitations. Just by way of example, traditional forms have been restricted with respect to creating a derived form from a base form, including, for example, the techniques utilized for providing inheritance from the base form to the derived form.

There is thus a need for addressing these and/or other issues associated with the prior art.

SUMMARY

A system, method, and computer program product are provided for creating a second form based on a first form where the first and second forms are defined in extended markup language (XML). In use a first form is identified. Additionally, a second form is created based on the first form. Further, the first form and the second form are defined in XML.

DETAILED DESCRIPTION

Figure 1:
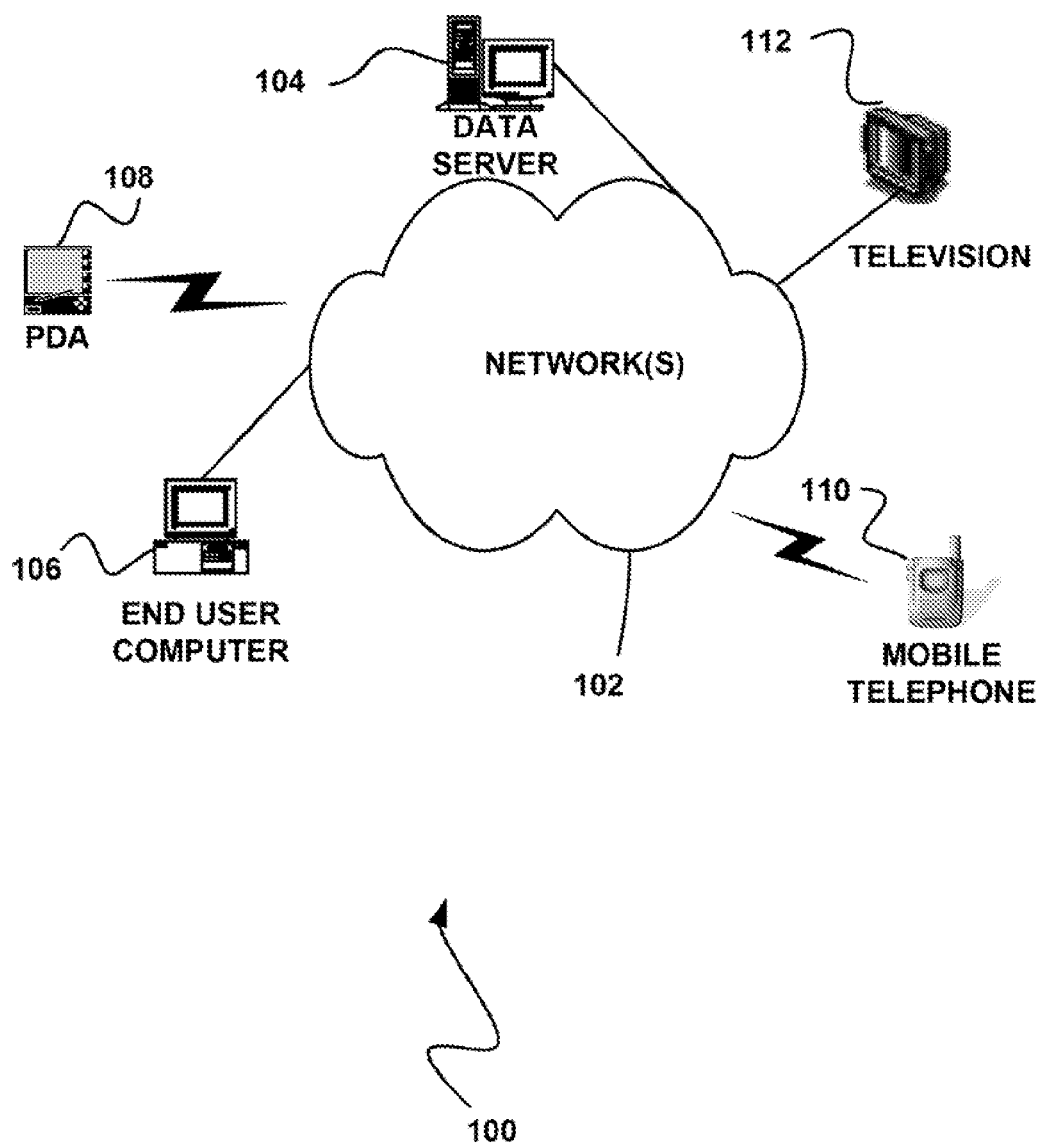
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
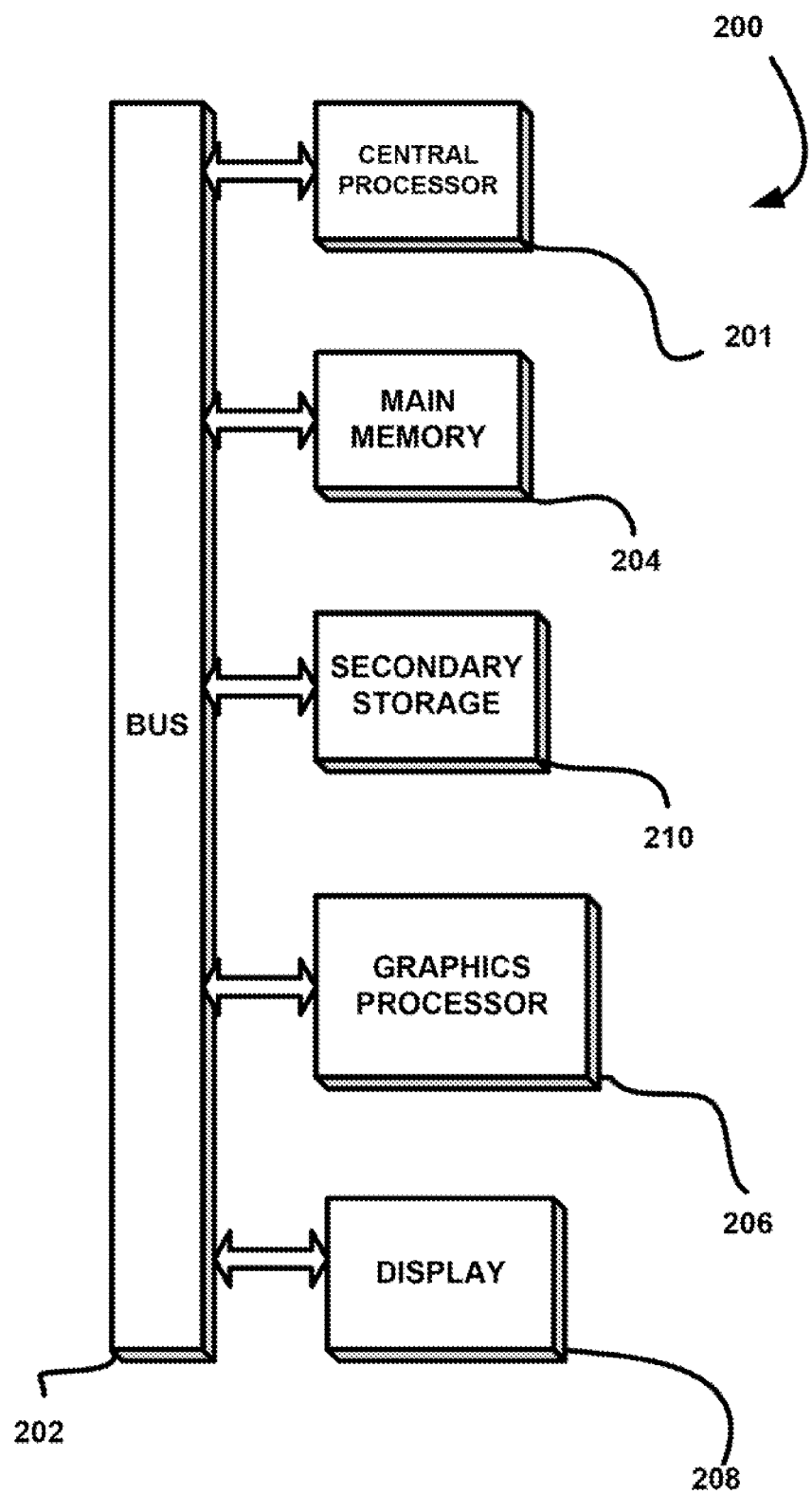
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
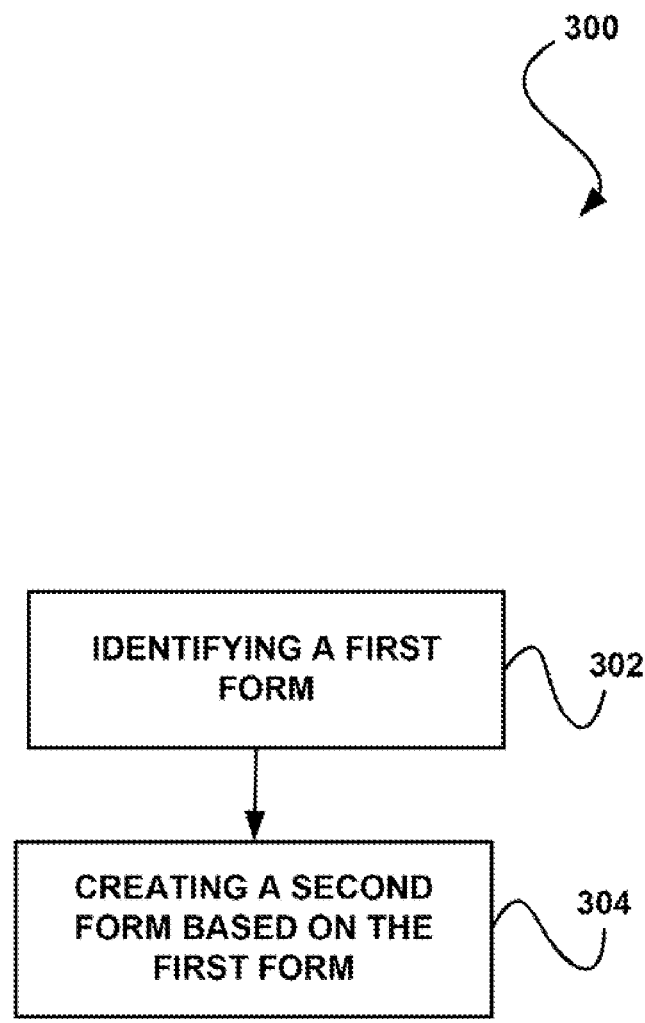
FIG. 3 shows a method for creating a second form based on a first form where the first and second forms are defined in XML, in accordance with one embodiment.

FIG. 3 shows a method 300 for creating a second form based on a first form where the first and second forms are defined in extended markup language (XML), in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a first form is identified. In the context of the present description, the first form may include any form defined in XML from which another form may be derived, the reasons for which will be set forth below in more detail. In one example, the first form may include a template. In another example, the first form may be a base form. To this end, the first form may be capable of being utilized as a basis for creating another form (e.g. a customized form, etc.), as described in more detail below.

In one embodiment, the first form may include a user interface form. For example, a user interface may be capable of being created utilizing the first form. As an option, a user interface may be created based on the first form.

In another embodiment, the first form may include a report form. In this case, a report may be created utilizing the first form. Of course, in other embodiments, the first form may be capable of being utilized for creating any desired document, code, image, page, display screen, etc.

Additionally, the first form may be identified in any desired manner. In one embodiment, the first form may be manually identified. For example, the first form may be selected by a user. As an option, the first form may be selected from a library of forms.

In another embodiment, the first form may be automatically identified. Just by way of example, the first form may be identified by an application. Optionally, the first form may be identified for customization, configuration, and/or other various purposes.

Further, as shown in operation 304, a second form is created based on the first form, where the first form and the second form are defined in XML. In the context of the present description, the second form may include any form defined in XML that is capable of being created based on the first form. Thus, the second form may include a derived form.

For example, creating, the second form based on the first form may include deriving the second form from the first form. Accordingly, the second form may include a user interface form (e.g. such that a user interface may be capable of being created utilizing, the second form), a report form (e.g. such that a report may be created utilizing the second form), a document form, a code form, an image form, a page form, a display screen form, etc. Optionally, the second form may include a template, such that the second form may also be the basis for creating, another (third) form.

Further, creating the second form may include generating, developing, etc. the second form, copying, in part, the first form, etc. Optionally, the second form may only include data different from data in the first form. In this case, only a difference between the first form and the second form may be stored in a definition of the second form. For example, only desired changes to be made to the first form, via implementation utilizing the second form, may be stored in the second form. Accordingly, the second form may be created by merging the stored difference and the base form.

In one embodiment, the second form may include a customized version of the first form. For example, customization data may be utilized for customizing the first form via the second form. As an option, the customization data may be input (e.g. to an application capable of automatically creating the second form from the first form, etc.) by a user. As yet another option, the customization data may be input by a plurality of users associated with different organizations (e.g. companies, etc.), thus providing multi-level customization of the first form.

In another embodiment, the second form may include a secondary version of the first form. For example, the second form may be utilized in circumstances different from circumstances in which the first form is utilized. To this end, different predefined criteria (e.g. determined by a user, etc.) may be associated with the first form and the second form, such that it may be determined which of the first form and the second form is to be utilized. Of course, as another option, the second form may include a default form returned when the first form is requested.

Moreover, the first form and the second form may be defined in XML in any desired manner. With respect to the present description, the XML definition for each of the first form and the second form may define aspects of the first form and the second form. For example, such aspects may include created objects, object properties, a visual layout, etc.

Thus, the XML definition for the first form may be different than the XML, definition for the second form. Further, defining the first form and the second form in XML may optionally allow a hierarchy of visual elements to be created and persisted in such definition. For example, a hierarchy inherent in the XML programming language may be used to represent the hierarchy of visual elements of the first form and/or the second form.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
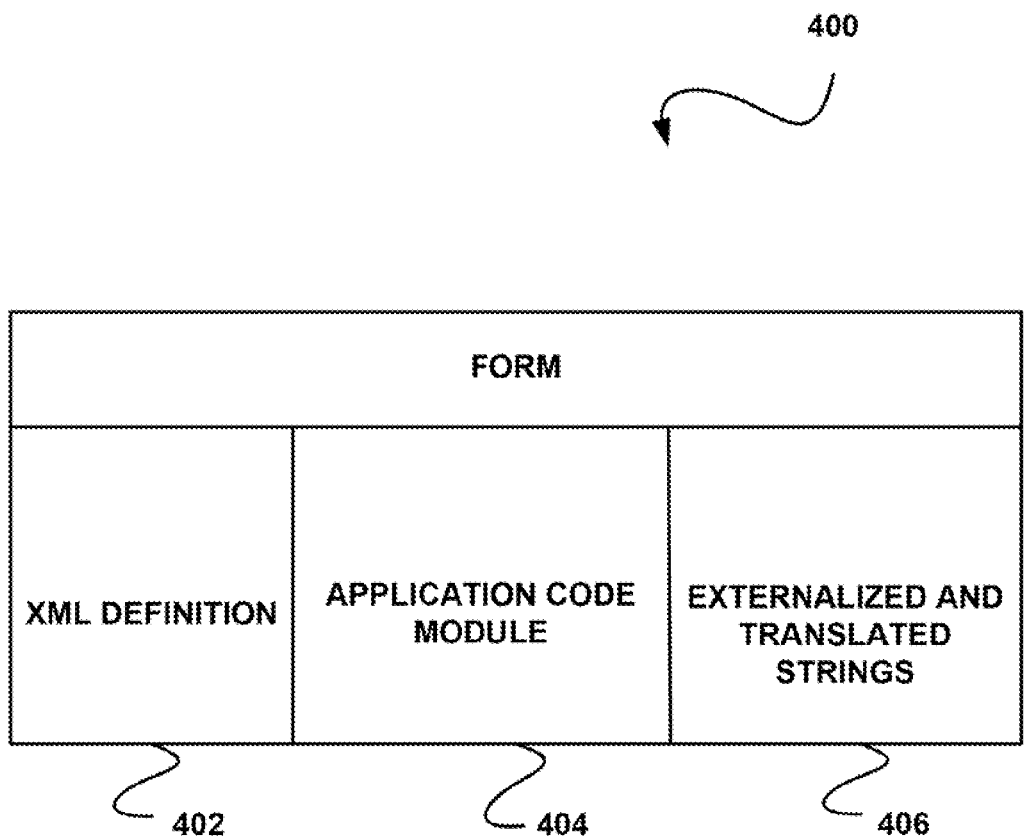
FIG. 4 shows a structure of a form, in accordance with another embodiment.

FIG. 4 shows a structure of a form 400, in accordance with another embodiment. As an option, the form structure 400 may be implemented in the context of the details of FIGS. 1-3. For example, the form structure 400 may include the structure of the first form and/or the second form described above with respect to FIG. 3. Of course, however, the form structure 400 may be implemented in any desired environment. Further, the aforementioned definitions may equally apply to the description below.

As shown, the form structure 400 includes a plurality of components, including an XML definition 402, an application code module 404, and externalized and translated strings 406. As an option, such components may be stored separately (e.g. in separate files, etc.). Thus, each component may be mapped to the associated form structure 400 (e.g. utilizing a database, table, etc.).

in one embodiment, the XML definition 402 may be stored in a file with a .uif extension. Thus, the XML definition 402 may be stored in a universal text format file utilizing the universal transformation format-8 (UTF-8) character set. In another embodiment, the application code module 404 may be stored in a file with a java extension, such that the application code module 404 may be stored in a java file. In yet another embodiment, the externalized and translated strings 406 may be stored in a file with a properties extension. Accordingly, the externalized and translated strings 406 may be stored in a properties file.

Optionally, the XML definition 402 may include the XML definition described with respect to FIG. 3. In addition, the XML definition 402 may define objects created in the form, in addition to properties of each of such objects. For example, the objects may include non-visual objects, such as data model objects, action objects, data communication objects, etc. As an option, the objects and associated properties may be defined utilizing a form editor tool. Further, such form editor tool may preserve the objects and associated properties in an XML format.

In addition, the XML definition 402 may define a visual layout of the form. Such visual layout may indicate a location of each control (e.g. visual element) with respect to the form. In one embodiment, the controls may include containers, such that a hierarchy of controls (e.g. a user interface hierarchy) may be created and persisted in the XML definition 402. For example, a hierarchy inherent in the XML coding language may be used to represent the hierarchy of controls.

To this end, objects defined by the XML definition 402 of the form may be associated with the visual layout of the form, and may therefore include visual objects. As mentioned above, some of the objects defined by the XML definition 402 may be non-visual, and thus may not necessarily be associated with the visual layout of the form. Accordingly, non-visual objects may be provided to the form for possible incorporation into the visual layout of the form, as desired.

Optionally, the form structure 400 may be associated with a derived form (e.g. created based on a base form). In this case, the XML definition 402 of such derived form may include additional new objects not present in the base form. In another embodiment, such XML definition 402 may include modifications of property values assigned to properties of objects defined on the base form. In still yet another embodiment, the XML definition 402 may include reordering, deletion, or insertion of elements in properties of objects defined on the base form.

In yet another embodiment, the XML definition 402 may include a redefinition of the visual layout for the base form. In this way, an XML definition 402 of a derived form may be different from an XML definition 402 for a base form from which such derived form is created. As an option, inheritance may be provided to the XML definition 402 of the form structure 400, such that data in an XML definition 402 of a derived form may be inherited from an XML definition 402 of an associated base form.

Furthermore, the application code module 404 of the form structure 400 may define various methods utilized and/or capable of being utilized by the form. For example, if the form includes a base form, the application code module 404 may define event handler methods. The event handler methods may be executed by the objects of the form as such objects are acted upon (e.g. called, referenced, interacted with, etc.).

If the form includes a derived form, the application code module 404 may use inheritance (e.g. such as Java™ class inheritance, etc.). For example, the inheritance may be utilized to extend an application code module 404 associated with a base form. Further, the application code module 404 may also include new event handler methods not defined, in the application code module 404 of the base form, or redefinitions of event handler methods defined in the application code module 404 of the base form.

Optionally, such redefinitions may call a super method. Further, a derived event handler for a given event may be called, corresponding to the use of an overriding Java™ method. For example, a given event may be dispatched only once, even with multiple event handlers defined throughout a derivation hierarchy.

Optionally, a multi-level, ordered dispatch structure may be provided to the event handling methods defined by the application code module 404 (of the base form or a derived form). In this way, utilization of an unordered listener paradigm by the event handling methods defined by the application code module 404 may be prevented.

Additionally, the externalized and translated strings 406 of the form structure 400 may include resource files. Such resource files may be utilized by the application code module 404, for example. In one embodiment, externalized and translated strings 406 of a derived form may only include new resources and changes to strings with respect to externalized and translated strings 406 of an associated base form. For example, inheritance of externalized string resources may be provided between a derived form and a base form.

As an option, an inheritance tool may be utilized for various inheritance utilized by the form structure 400. For example, the inheritance tool may provide language inheritance (e.g. en_us overrides en). Further, the inheritance tool may provide form inheritance, in another embodiment. Moreover, multiple levels of such inheritance may also be provided.

Figure 5:
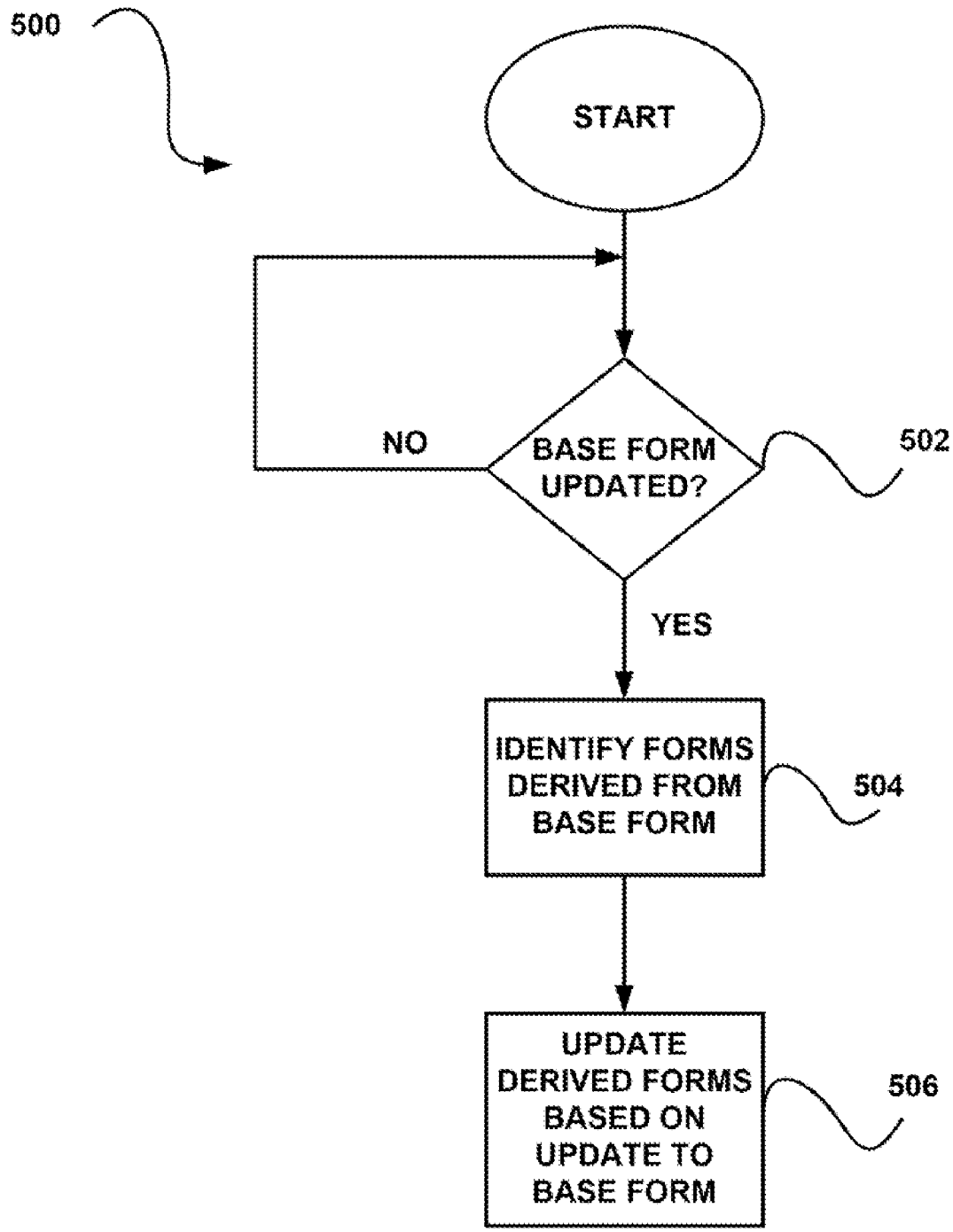
FIG. 5 shows a method for updating a derived form, in accordance with yet another embodiment.

FIG. 5 shows a method 500 for updating a derived form, in accordance with yet another embodiment. As an option, the method 500 may be carried out in the context of the details of FIGS. 1-4. Of course, however, the method 500 may be carried out in any desired environment. Again, the aforementioned definitions may equally apply to the description below.

As shown in decision 502, it is determined whether a base form has been updated. In the context of the present embodiment, an update to the base form may include any modification of the base form. For example, the update may include a new XML definition associated with new objects (e.g. visual elements, etc.) included in the base form. In this way, the base form may be changed from a first state to a second different state, in accordance with the update.

Just by way of example, the base form may be updated according to a new release of a product which includes the base form. Thus, the determination may be made according to receipt of a new release of a product that utilizes the base form. Of course, however, the determination of whether the base form has been updated may be made based on any desired event e.g. including a manual inspection of the base form, a scheduled inspection of the base form, etc.).

Once the base form is updated, forms derived from the base form are identified. Note operation 504. In one embodiment, the derived forms may be identified utilizing a table that maps the base form to such associated derived forms. Of course, however, the forms derived from the base form may be identified in any manner.

Further, the derived forms are updated based on the update to the base form, as shown in operation 506. In this way, the derived forms may be automatically updated in response to an update of the base form. For example, any component of a structure of the derived forms may be updated according to the update to the base form.

As an option, each of the derived forms may only be updated when the derived forms are accessed for editing purposes. As another option, an editing tool capable of creating, editing, persisting, etc. base and derived forms may be utilized for such editing purposes. Moreover, any edits to the derived forms may optionally be performed on a client system via user input. To this end, the derived forms may include upgradeable customizations of the base form.

As another option, each of the derived forms may only be updated in response to a validation of the update. For example, the update to the derived forms may be automatically validated prior to applying such update to the derived forms. If the validation does not pass (e.g. indicates a potential error in updating the derived form, etc.), an alert may be communicated to a user.

For example, the alert may allow the user to manually select any portions of the update to be applied to each of the derived forms, such as portions of the update not associated with potential error, etc. in this way, the user may be provided with the option of blocking the update, or any particular portion of the update. Just by way of example, the user may select to incorporate new logic into a derived form associated with the update to the base form, but not to incorporate a new layout into the derived form associated with the update to the base form. As another option, the alert may allow the user to correct any conflicts between the update and the derived forms causing such error.

In one exemplary embodiment, if the base form was updated with new visual elements, the derived form may be updated to include such new visual elements. As an option, the new visual elements may only be stored in the form structure of the derived form as non-visual objects, for example, if the derived form has a different visual layout than the base form. However, the non-visual elements added to the form structure of the derived form may become visual elements when incorporated into the visual layout of the derived form (e.g. by a user, etc.). Thus, the form structure of the derived form may be created by merging the base form with any differences between the base form and the derived form. Accordingly, derived forms associated with an updated base form may optionally be updated with limited or no manual intervention.

Figure 6:
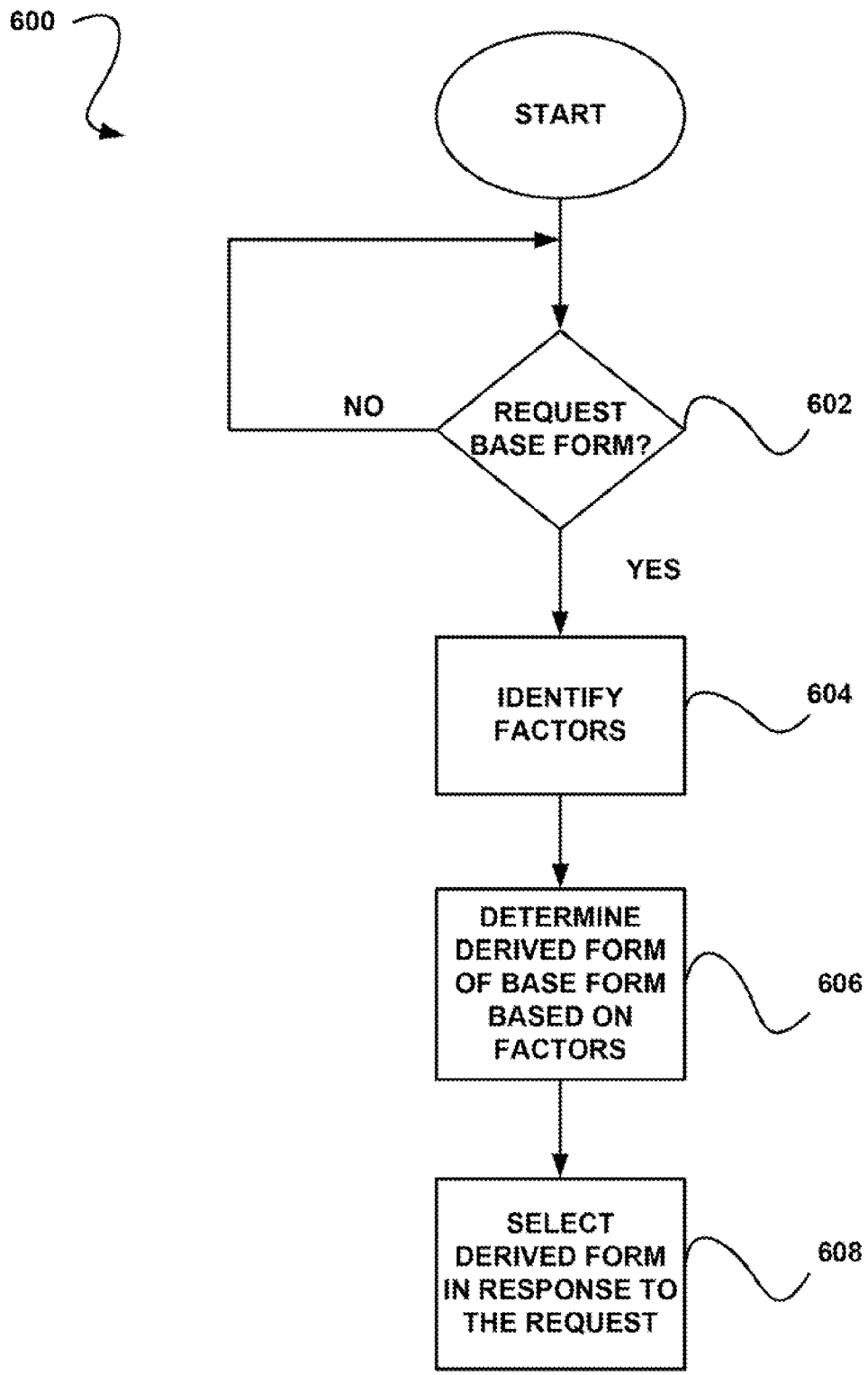
FIG. 6 shows a method for selecting a derived form in response to a request for a base form, accordance with still yet another embodiment.

FIG. 6 shows a method 600 for selecting a derived form in response to a request for a base form, in accordance with still yet another embodiment. As an option, the method 600 may be implemented in the context of the details of FIGS. 1-5. Of course, however, the method 600 may be carried out in any desired environment. Further, the aforementioned definitions may equally apply to the description below.

As shown in decision 602, it is determined whether a base form has been requested. In one embodiment, the base form may be requested by a user. In another embodiment, the base form may be requested automatically by an application, etc.). Further, the request may include a request to open the base form, access the base form, utilize the base form, etc.

In response to a determination that the base form has been requested, factors may be identified. Note operation 604. In one embodiment, the factors may be associated with the request for the base form. In another embodiment, the factors may be associated with a system via which the base form is requested. Just by way of example, the factors may include a language associated with (e.g. utilized by, etc.) the request and/or system, a user associated with the request and/or system, etc.

Further, a derived form of the base form is determined based on the factors, as shown in operation 606. Optionally, determining the derived form may include identifying the derived form from a plurality of derived forms. For example, the plurality of derived forms may each have been derived from the base form (e.g. for customizing the base form, providing different versions of the base form, etc.).

In one embodiment, the plurality of derived forms from which the derived form is determined may be identified based on a mapping of the base form to the associated derived forms. For example, a logical form name associated with the base form may be mapped to a physical form name associated with each of the associated derived forms.

In another embodiment, the derived form may be determined based on rules. Such rules may indicate factors associated with a particular derived form. Just by way of example, each derived form may be associated with at least one rule that indicates various factors associated with the derived form. Thus, the derived, form may be determined by matching the identified factors (e.g. from operation 604) with factors indicated by a rule of such derived form. As an option, the rules may be predefined by a user.

Thus, the derived form determined based on the factors is selected in response to the base form request, as Shown in operation 608. The derived form may be selected in any desired manner. In one exemplary embodiment, the derived form may be selected by returning the derived form in response to the request for the base form.

Moreover, the derived form may be automatically selected at run-time. Accordingly, such derived form may be automatically selected based on the request for the base form. Further, the derived form may also be selected based on the rules, an application of the identified factors to the rules, etc. Optionally, data may be loaded into the derived form after selection of the derived form.

Just by way of example, a request to launch base form "A" may be issued (e.g. by a user, by an application, etc.). In response, a version selector may select a derived form "A1" or "A2", etc. associated with such base form. For example, the derived forms "A1" "A2" may include forms derived from the base form "A".

The derived form "A1" or "A2" may further be selected based on various factors. For example, the factors may include a current language, a current user, etc. Thus, the factors may be applied to rules associated with each of the derived forms "A1" and "A2". In this way, it may be determined which derived form "A1." or "A2" has rules that are satisfied by the factors. Such determined derived form "A1" or "A2" may thus be selected in response to the request for the base form "A".

As another option, the base form "A" may simply be customized by the derived form "A1". Accordingly, a rule associated with various factors may not be required to select derived form "A1" in response to the request for based form "A". For example, derived form "A1" may be designated as the default derived form to be selected when the base form "A" is requested.

While various embodiments have been described above, it should be understood that they have been presented by way of example only, and not limitation. Thus, the breadth and scope of a preferred embodiment should not be limited by any of the above-described exemplary embodiments, but should be defined, only in accordance with the following claims and their equivalents.

What is claimed is:

1. A method, comprising:
   identifying a first form;
   creating a second form based on the first form, the first form and the second form being defined in extended markup language (XML), wherein a definition of the second form is provided inheritance from a definition of the first form such that the definition of the second form further includes only the difference between the first form and the second form, which are changes made to the first form;
   receiving a request for the first form;
   in response to the receipt of the request for the first form:
      identifying at least one factor associated with at least one of the request for the first form and a system via which the first form is requested;
   selecting the second form in response to:
      identifying at least one rule associated with the second form, the at least one rule predefined by a user;
      determining at least one factor indicated by the at least one rule; and
      matching the at least one determined factor indicated by the at least one rule to the at least one identified factor associated with the at least one of the request for the first form and the system via which the first form is requested; and
   returning the selected second form as a response to the request for the first form.

2. The method of claim 1, wherein at least one of the first form and the second form are utilized for creating user interfaces.

3. The method of claim 1, wherein the first form is identified based on a selection of the first form.

4. The method of claim 1, wherein the second form includes a customized version of the first form.

5. The method of claim 1, wherein a form structure of the second form is created by merging the first form with the difference.

6. The method of claim 1, wherein the definition of at least one of the first form and the second form defines non-visual objects.

7. The method of claim 1, wherein the definition of at least one of the first form and the second form defines visual objects.

8. The method of claim 1, wherein an application code module of the second form utilizes the inheritance.

9. The method of claim 8, wherein the inheritance is provided for externalized string resources.

10. The method of claim 1, wherein a plurality of event handling functions defined in an application code module of the second form are provided in an ordered event dispatch structure.

11. The method of claim 1, wherein the second form is selected automatically in response to the request for the first form.

12. The method of claim 1, wherein the second form is selected based on at least one of a language and a user.

13. The method of claim 1, wherein a logical name of the first form is mapped to a physical name of the second form.

14. The method of claim 1, further comprising automatically updating the second form in response to an update of the first form.

15. The method of claim 14, wherein the second form is automatically updated when the second form is accessed for editing purposes.

16. The method of claim 14, wherein the updated second form is validated, and, if the validation does not pass, an alert is communicated to the user, the alert allowing the user to manually select at least one portion of the update to be applied to the second form.

17. The method of claim 1, wherein different predefined criteria are associated with the first form and the second form and are used for determining which of the first form and the second form is to be utilized.

18. A computer program product embodied on a computer readable medium, comprising:
   computer code for identifying a first form;
   computer code for creating a second form based on the first form, the first form and the second form being defined in extended markup language (XML), wherein a definition of the second form is provided inheritance from a definition of the first form such that the definition of the second form further includes only the difference between the first form and the second form, which are changes made to the first form;
   computer code for receiving a request for the first form;
   computer code for, in response to the receipt of the request for the first form:
   identifying at least one factor associated with at least one of the request for the first form and a system via which the first form is requested;
   computer code for selecting the second form in response to:
      identifying at least one rule associated with the second form, the at least one rule predefined by a user;
      determining at least one factor indicated by the at least one rule; and
      matching the at least one determined factor indicated by the at least one rule to the at least one identified factor associated with the at least one of the request for the first form and the system via which the first form is requested; and
   computer code for returning the selected second form as a response to the request for the first form.

19. A system, comprising:
a processor for:
   identifying a first form;
   creating a second form based on the first form, the first form and the second form being defined in extended markup language (XML), wherein the definition of the second form is provided inheritance from a definition of the first form such that the definition of the second form further includes only the difference between the first form and the second form, which are changes made to the first form;
   receiving a request for the first form;
   in response to the receipt of the request for the first form:
   identifying at least one factor associated with at least one of the request for the first form and a system via which the first form is requested;
selecting the second form in response to:
   identifying at least one rule associated with the second form, the at least one rule predefined by a user;
   determining at least one factor indicated by the at least one rule; and
   matching the at least one determined factor indicated by the at least one rule to the at least one identified factor associated with the at least one of the request for the first form and the system via which the first form is requested; and
returning the selected second form as a response to the request for the first form.

20. The system of claim 19, wherein the processor is coupled to memory via a bus.

* * * * *

UNITED STATES PATENT AND TRADEMARK OFFICE
CERTIFICATE OF CORRECTION

| | | |
|---|---|---|
| PATENT NO. | : 8,078,956 B1 | Page 1 of 1 |
| APPLICATION NO. | : 11/870989 | |
| DATED | : December 13, 2011 | |
| INVENTOR(S) | : Feldman et al. | |

It is certified that error appears in the above-identified patent and that said Letters Patent is hereby corrected as shown below:

On the cover:
In the Abstract (57), line 5; please replace "Farther," with --Further,--.

Signed and Sealed this
Twentieth Day of March, 2012

David J. Kappos
*Director of the United States Patent and Trademark Office*